United States Patent Office 3,520,901
Patented July 21, 1970

3,520,901
TETRAHYDROINDAZOLES
Giangiacomo Massaroli, Milan, Italy, assignor to Polichimica Sap S.p.A., Milan, Italy
No Drawing. Filed July 7, 1967, Ser. No. 651,675
Claims priority, application Italy, July 16, 1966, 16,562/66; Apr. 4, 1967, 14,556/67
Int. Cl. C07d 49/20
U.S. Cl. 260—310          28 Claims

ABSTRACT OF THE DISCLOSURE

New substituted 3 - amino-tetrahydroindazole compounds possessing anti-inflammatory properties, and process for the preparation thereof; said compounds conforming to the general formula:

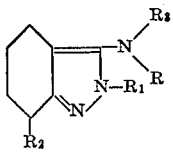

wherein R represents hydrogen or lower alkyl, $R_1$ represents hydrogen, lower alkyl, β-hydroxyethyl,

—$CH_2$—CHOH—$CH_2SCH_3$ phenyl, halophenyl, (lower alkoxy)phenyl, —$COOC_2H_5$, —$CH_2COOC_2H_5$, benzoyl, halobenzoyl, or (lower alkoxy)benzoyl, and $R_1$ when a benzoyl group is alternatively in the 1-position of the indazole ring, $R_2$ represents hydrogen, lower alkyl, carboxyl or $CSNHCH_3$ and $R_3$ represents lower alkyl, lower alkenyl or aralkyl and their non-toxic acid addition salts.

---

This invention relates to 3-amino-tetra-hydroindazoles and their production.

The present invention provides the new 3-amino-tetrahydroindazoles of the general formula:

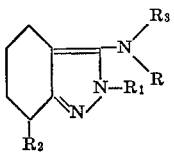

R represents hydrogen or lower alkyl, $R_1$ represents hydrogen, lower alkyl, β-hydroxyethyl,

—$CH_2$—CHOH—$CH_2SCH_3$ phenyl, halophenyl, (lower alkoxy)phenyl, —$COOC_2H_5$, —$CH_2COOC_2H_5$, benzoyl, halobenzoyl, or (lower alkoxy)benzoyl, and $R_1$ when a benzoyl group is alternatively in the 1-position of the indazole ring, $R_2$ represents hydrogen, lower alkyl, carboxyl, or $CSNHCH_3$ and $R_3$ represents lower alkyl, lower alkenyl or aralkyl and their non-toxic acid addition salts. By "lower alkyl," "lower alkoxy," and "lower alkenyl" are meant alkyl, alkoxy and alkenyl radicals of up to 4 carbon atoms each.

According to the invention, the compounds of general Formula I are obtained by reacting an enamino-thiocarboalkylamide of the formula:

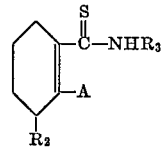

where A represents an N-morpholino, N-pyrrolidino, or N-piperidino residue and $R_2$ and $R_3$ are as hereinbefore defined, or the corresponding ketone, obtained from II by mild hydrolysis, with a hydrazine of the formula: $R_1NHNH_2$, where $R_1$ is as hereinbefore defined, and the so-obtained compound of the formula

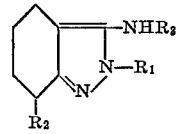

is optionally alkylated on the amino nitrogen atom.

Such optional alkylation may, for example, be methylation effected with formaldehyde and formic acid.

When $R_1$ is hydrogen, the compounds of Formula I may be optionally acylated on the ring nitrogen atom in the 1- or 2-position with benzoyl chloride, halo-benzoyl chloride or (lower alkoxy)benzoyl chloride.

It will be understood that when $R_1$ is hydrogen, the compounds of Formula I may exist in tautomeric forms, which may be represented as follows:

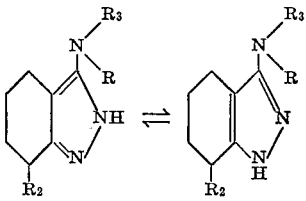

It follows that when a compound of Formula I in which $R_1$ is hydrogen, is acylated, the acyl group may attach itself to the 1- or 2-position. When a halo-benzoyl of (lower alkoxy)benzoyl chloride is used for this acylation, the substituent is ordinarily in the para-position.

The compounds of Formula II may themselves be made by the reaction of a compound of the formula:

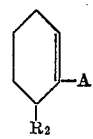

with an isothiocyanate of the formula: $R_3NCS$, where $R_2$, $R_3$ and A are as hereinbefore defined. This reaction may be effected by heating equimolar proportions of the reactants for 6-8 hours on a water-bath, at a temperature in the range of 80°–100° C. The product is generally employed in the crude state in the subsequent reaction with the hydrazine of formula: $R_1NHNH_2$.

Thus, the enamino-bis-thiocarbomethylamide of Formula II where A is morpholino, $R_2$ is $CSNHCH_3$ and $R_3$ is $CH_3$, may be prepared by reacting 1 mole of the corresponding enamine of Formula IV wherein $R_2=CSNHCH_3$, with 1 mole of methyl isothiocyanate, or directly from 1-morpholinocyclohexane by reaction with 2 moles of methyl isothiocyanate. However, even better results are obtained by reacting 2 moles of methyl isothiocyanate with 1 mole of 1-N-pyrrolidino-cyclohexane. The 1-pyrrolidino-2,6 - di(thiocarbomethylamino)-1-cyclohexene so obtained behaves in the subsequent process steps like the corresponding 1 - morpholino-2,6-di(thiocarbomethylamino)-1-cyclohexene.

For the preparation of compounds of general Formula I (wherein $R_2=CSNHCH_3$, R=H, $R_3=CH_3$ and $R_1$=phenyl or one of the groups listed in Table 4), the 2,6-di(thiocarbomethylamino)-1-cyclohexanone, obtained from II where A is pyrrolidino, $R_2$ is $CSNHCH_3$ and $R_3$ is $CH_3$ by mild acidic hydrolysis, has been preferably subjected to the reaction with the hydrazine of formula $R_1NHNH_2$ in which $R_1$=phenyl or one of the groups listed in Table 4.

The course of the reaction between the compounds of Formula II and the hydrazines of formula $R_1NHNH_2$, and the ensuing position of the substituent $R_1$ in the indazole nucleus produced, follows in general the scheme ascertained by Pocar et al., Gazz. Chim. Ital., 93, 100–113 (1963). Hydrazone formation occurs, and the hydrazone cyclizes with splitting off of hydrogen sulphide.

When $R_1$ is ethoxycarbonyl, the course of the reaction of the hydrazine of formula $R_1NHNH_2$ with the compound of Formula II depends in part on the nature of the substituent $R_2$. Thus, when $R_2=CSNHCH_3$ the compound formed is one in which $R_1$ is ethoxycarbonyl and $R_2$ represents $CSNHCH_3$, whereas, the $R_2$ represents hydrogen or methyl, the compound formed is one in which the indazole nucleus is free of substituents in 1- and 2-positions.

Reaction of tetrahydroindazoles of general Formula I where R and $R_1$ are both hydrogen with the calculated amount of formaldehyde and formic acid leads to methylation of the amino nitrogen, not of the heterocyclic nitrogen. This is proved by the fact that reaction of the compound of Formula I in which R, $R_1$ and $R_2$ are hydrogen and $R_3$ is methyl with formaldehyde and formic acid gives a compound which is different from that obtained by reaction of the compound of Formula II in which $R_2$ is hydrogen, $R_3$ is methyl, and A is morpholino with $CH_3NHNH_2$. The former compound is able to react with benzoyl chloride to give a compound of Formula I wherein $R_2$ is hydrogen, R and $R_3$ are methyl, and $R_1$ is benzoyl.

The compounds of Formula I show analgesic and anti-inflammatory activity, as shown in the following Table 1, wherein the activity of the new compounds is compared with that of two known analgesic and anti-inflammatory substances, aminopyrine and phenylbutazone. In particular it may be noted that aminopyrine shows good analgesic properties, but poor anti-inflammatory properties and phenylbutazone shows good anti-inflammatory properties but poor analgesic activity. However, several compounds of the present invention show both analgesic and anti-inflammatory activities simultaneously to a high degree, so that the new compounds are superior to aminopyrine and phenylbutazone in the treatment of rheumatic diseases wherein an anti-inflammatory and an analgesic action are simultaneously required.

The various kinds of activity indicated in Table 1 were determined by the following tests (a) Test of Bianchi and Franceschini, Brit. J. Pharmacol., 9, 280 (1954)

(b) Test of Randall and Selitto, Arch. Int. Pharmacodyn., 4, 409 (1957)

(c) Test of Hendershot and Forsaith, J. Pharmacol. Exp. Th. 125, 237 (1959)

(d) Test of Winter et al., J. Pharmacol. Exp. Ther. 141, 369 (1963)

(e) Test of Wilhelmi, Schweiz. Med. Wochr. 88, 185 (1958).

TABLE 1

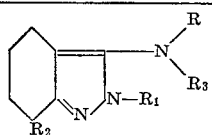

| Compound | R | $R_1$ | $R_2$ | $R_3$ |
|---|---|---|---|---|
| 1 | | | | |
| 2 | H | — | H | $CH_3$ |
| 3 | H | — | $CSNHCH_3$ | $CH_3$ |
| 4 | H | — | COOH | $CH_3$ |
| 5 | H | Cl—— | H | $CH_3$ |
| 6 | H | H | H | $CH_3$ |
| 7 | H | Cl—— | $CSNHCH_3$ | $CH_3$ |
| 8 | $CH_3$ | —CO— | H<br>H | $CH_3$<br>$CH_3$ |
| 9 | H | $CH_3$ | H | $CH_3$ |
| 10 | H | —$COOC_2H_5$ | $CSNHCH_3$ | $CH_3$ |
| 11 | $CH_3$ | CO——CO— | H | $CH_3$ |
| 12 | $CH_3$ | $CH_3O$——CO— | H | $CH_3$ |
| 13 | H | $CH_3O$—— | $CSNHCH_3$ | $CH_3$ |

TABLE 1—Continued

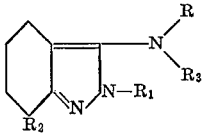

| Compound | R | R1 | R2 | R3 |
|---|---|---|---|---|
| 14 | H | —CH$_2$COOC$_2$H$_5$ | H | CH$_3$ |
| 15 | H | H | CH$_3$ | CH$_3$ |

| | R | R1 | R2 | R3 |
|---|---|---|---|---|
| 16 | H | CH$_3$ | CSNHCH$_3$ | CH$_3$ |
| 17 | H | CH$_3$ | H | C$_2$H$_5$ |
| 18 | H | CH$_3$ | H | i-C$_3$H$_7$ |
| 19 | H | CH$_3$ | H | n-C$_4$H$_9$ |
| 20 | H | CH$_3$ | H | C$_6$H$_5$CH$_2$ |
| 21 | H | CH$_3$ | H | —CH$_2$—CH=CH$_2$ |
| 22 | H | CH$_3$ | H | n-C$_3$H$_7$ |
| 23 | H | CH$_2$CH$_2$CH | H | CH$_3$ |
| 24 | H | n-C$_4$H$_9$ | H | CH$_3$ |
| 25 | H | C$_2$H$_5$ | H | CH$_3$ |
| 26 | H | n-C$_3$H$_7$ | H | CH$_3$ |
| 27 | H | CH$_2$CHOHCH$_2$SCH$_3$ | H | CH$_3$ |
| 28 | | Aminopyrine | | |
| 29 | | Phenylbutazone | | |

| | Analgesic Activity | | | Anti-Inflammatory Activity | | | LD$_{50}$ in mice per os (mg./kg.) |
|---|---|---|---|---|---|---|---|
| Compound | Non-inflammatory pain (a) | Inflammatory pain (b) | p-Quinone test (c) | Granuloma from cotton pellets (d) | Oedema from carragenin (e) | Peritonitis from formalin (f) | |
| 1 | | | | | | | |
| 2 | ++++ | ++++ | +++++ | + | + | +++ | 550 |
| 3 | ++++ | +++++ | +++ | + | +++ | ++ | 1,000 |
| 4 | ++ | + | | | | + | >1,000 |
| 5 | + | + | | — | | | 700 |
| 6 | +++ | +++ | +++ | ++ | | +++ | 690 |
| 7 | +++ | +++ | | | — | | >1,000 |
| 8 | +++ | +++ | | | | | >1,000 |
| 9 | ++++ | +++++++ | ++++ | +++ | +++ | +++ | 600 |
| 10 | +++ | +++ | ++ | + | — | +++ | >1,000 |
| 11 | + | + | | | — | | >1,000 |
| 12 | + | ++ | | | | | >1,000 |
| 13 | + | ++ | | | — | | >1,000 |
| 14 | + | ++ | | | ++ | | 700 |
| 15 | + | + | | | + | | >1,000 |
| 16 | +++ | +++ | | + | ++ | | >1,000 |
| 17 | + | +++++ | | +++ | +++ | | >1,000 |
| 18 | + | +++ | | | ++ | | 900 |
| 19 | + | ++ | | | ++ | | 700 |
| 20 | + | + | | | ++ | | 700 |
| 21 | +++ | +++++ | | | + | | 500 |
| 22 | ++ | +++ | | | + | | 700 |
| 23 | + | +++ | | | + | | >1,000 |
| 24 | +++ | + | | | + | | 700 |
| 25 | ++ | | | | + | | 900 |
| 26 | ++ | ++++ | | | + | | 900 |
| 27 | ++ | +++ | | | + | | >1,000 |
| 28 | ++ | +++ | +++ | — | — | ++ | 750 |
| 29 | — | ++ | + | +++ | +++ | +++ | 900 |

[1] Substituent R1 is probably linked to 1-position of indazole ring.

The following examples illustrate the invention.

EXAMPLE 1

1-morpholino-2-thiocarbomethylamino-1-cyclohexene

In a 500 ml. flask provided with condenser and protected against the moisture by means of a calcium chloride tube, 80.3 g. (1.1 moles) of methyl isothiocyanate and 167 g. (1 mole) of 1-morpholino-cyclohexene are introduced. The mixture is heated for 6 hours on a water-bath at 75°–85° C. and then diluted with 250 ml. of diisopropyl ether and stirred vigorously while it cools. After a short time the oily suspension solidifies into a yellow mass which is allowed to stand overnight, filtered off and washed with diisopropyl ether. 215 g. (90%) of 1-morpholino - 2 - thiocarbomethylamino-1-cyclohexene are obtained, which after recrystallization from the smallest amount of methanol melts at 81°–83° C.

*Analysis.*—Calc. for $C_{12}H_{20}N_2OS$ (percent): N=11.66, S=13.33. Found (percent): N=11.44, S=13.21.

Proceeding in the same manner from equi-molar amounts of 1-morpholino-6-methyl-1-cyclohexene and methylixothiocyanate, a 30% yield is obtained of 1-morpholino-2-thiocarbomethylamino-6 - methyl-1-cyclohexene as a yellow compound melting at 145°–149° C.

*Analysis.*—Calc. for $C_{13}H_{22}N_2OS$ (percent): S=12.59. Found (percent): S=12.40.

EXAMPLE 2

2,6-di-(thiocarbomethylamino)-1-cyclohexanone

Into a wide-necked flask containing 14.6 g. (0.2 mole) of methyl isothiocyanate, 15.1 g. (0.1 mole) of 1-pyrrolidino-1-cyclohexene are introduced with stirring within about 30 minutes, while the temperature is kept below 40° C. with an ice bath. At the end of the reaction, the bath is removed, and the flask is allowed to stand at room temperature for 24-36 hours. 30-55 ml. of diisopropyl ether are added to the thick reaction mass, which is then triturated until it solidifies. The yellow solid product is filtered off, air-dried, and suspended in ethanol (1 ml./g.). Dilute hydrochloric acid (1:1) is added until the mixture has a persistent acid reaction, and 5-6 volumes of water are then added. An oil separates which solidifies within a few hours. The solid is filtered off and recrystallized from ethanol. 12.3 g. (50%) of 2,6-di - (thiocarbomethylamino)-1-cyclohexanone, M.P. 148°-150° C., are obtained.

*Analysis.*—Calc. for $C_{10}H_{16}N_2OS_2$ (percent): S=26.22, N=11.47. Found (percent): S=25.5, N=11.77.

EXAMPLE 3

2-phenyl-3-methylamino-4,5,6,7-tetrahydroindazole

Into a 250 ml. flask 13.3 g. (0.055 mole) of 1-morpholino-2-thiocarbomethylamino-1-cyclohexene, 7.92 g. (0.055 mole) of phenylhydrazine hydrochloride, and 70 ml. of 95% ethanol are introduced. The mixture is boiled under reflux for 6 hours, the solvent is evaporated in vacuo and the residue is triturated with diethyl ether to separate the morpholino hydrochloride, which is filtered off. The filtrate is evaporated to dryness, and 20 ml. of dilute hydrochloric acid (1:1) are added to the residue. The mixture is boiled for 30 minutes with charcoal and filtered hot. After cooling, the crystals which separate are filtered off, washed with acetone and diethyl ether until colourless, dried, and finally recrystallized from water. They then melt at 182-184° C. The yield is 65%.

*Analysis.*—Calculated for $C_{14}H_{17}N_3HCl$ (percent): N=15.96. Found (percent): N=16.41.

It contained the theoretical proportion of hydrochloric acid.

By the same method the compounds listed in the following Table 2 are obtained from equimolar amounts of the appropriate starting materials.

*Analysis.*—Calc. for $C_8H_{13}N_3 \cdot HCl$ (percent): N=22.45.

Found (percent): N=22.74.

The hydrochloric acid titre is 99.1% of theory.

By an identical process, equimolar amounts of 1-morpholino-6-methyl-1-cyclohexene and ethoxycarbonyl hydrazine are reacted, and 3-methylamino-7-methyl-4,5,6,7-tetrahydroindazole hydrochloride, M.P. 189°-191° C., is obtained in a yield of 56%.

*Analysis.*—Calc. for $C_9H_{15}N_3 \cdot HCl$ (percent): N=20.89.

Found (percent): N=20.96.

The hydrochloric acid titre is 100% of theory.

EXAMPLE 5

2-methyl-3-methylamino-4,5,6,7-tetrahydroindazole

A solution of 50.6 g. (1.1 moles) of methylhydrazine in 100 ml. absolute ethanol is dropped in about 30 minutes into a stirred mixture of 240 g. (1 mole) of crude 1 - morpholino - 2 - thiocarbomethylamino - 1 - cyclohexene, 350 ml. of absolute ethanol and 120 g. (2 moles) of acetic acid. The temperature is kept in this first step below 35° C. At the end of the addition, when the gas evolution has slackened, the mixture is heated to boiling and refluxed for 3 hours. It is then evaporated in a vacuum, and the residue is diluted with 1.5 litres of water. About 80 g. of tartaric acid are added and the mixture is allowed to stand overnight. Activated charcoal is added, the separated tarry products are removed, and the solution is concentrated in vacuo to ⅓ of its original volume and saturated with solid potassium carbonate. The organic layer is extracted with benzene, and the extract is dried over sodium sulphate and evaporated in vacuo. The residue is distilled at 115°-125° C./0.05-0.1 torr and the distillate is recrystallized from diisopropyl ether. It has M.P. 92°-93° C.

*Analysis.*—Calc. for $C_9H_{15}N_3$ (percent): N=25.45. Found (percent): N=25.12.

TABLE 2

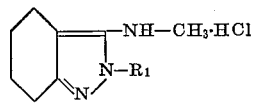

| R1 | Yield, percent | Analysis | | | | Hydrochloride titre, percent | M.P., °C. |
|---|---|---|---|---|---|---|---|
| | | Cl percent | | N percent | | | |
| | | Calc. | Found | Calc. | Found | | |
| Cl—⟨phenyl⟩— | 63.7 | 23.91 | 23.82 | 14.14 | 13.86 | 99.5 | 162-164 |
| CH₃O—⟨phenyl⟩— | 60 | -------- | -------- | 14.33 | 14.31 | 100.6 | 178-180 |
| —CH₂COOC₂H₅ | | -------- | -------- | 15.38 | 15.62 | 100.2 | 145-147 |

EXAMPLE 4

3-methylamino-4,5,6,7-tetrahydroindazole

Into a 250 ml. flask are introduced 27 g. (0.1125 mole) of 1-morpholino-2-thiocarbomethylamino-1-cyclohexene, 11.7 g. (0.1125 mole) of ethoxycarbonylhydrazine, 100 ml. of absolute ethanol, and 30 ml. of glacial acetic acid. The mixture is heated under reflux for 3 hours and evaporated to dryness in a vacuum. The residue is taken up with diethyl ether, and the solution is filtered and treated with ethereal hydrochloric acid. A gummy precipitate is formed which is separated from the ether by decantation and heated with acetone to cause its solidification. The solid is filtered off and recrystallized from acetone-ethanol. 12.8 g. (75%) of 3-methylamino-4,5,6,7 - tetrahydroindazole hydrochloride, M.P. 192°-194° C., are obtained.

Its acidimetric titre is 100.3% of theory. The maleate melts at 150-153° C.

EXAMPLE 6

2-methyl-3-ethylamino-4,5,6,7-tetrahydroindazole 33.5 g. (0.2 mole) of 1-morpholino-1-cyclohexene and 17.4 g. (0.2 mole) of methyl isothiocyanate are heated at 100° C. for 7 hours on a water-bath. After cooling, 200 ml. of ligroin are added and the mixture is stirred vigorously. The insoluble matter is allowed to settle, is separated by decantation from the ligroin, and taken up in 80 ml. ethanol and 14 ml. acetic acid, and treated with 8 g. (0.175 mole) of methylhydrazine. The mixture is refluxed for 4 hours, the solvent is removed in vacuo, the residue is taken up in about 200 ml. of 10% aqueous tartaric acid solution and the solution is stirred a long time with charcoal and filtered. After concentration to half volume, the solution is made alkaline with excess potassium carbonate, the separated oil is extracted with benzene, the benzene extract is dried over sodium sulphate and, after the solvent has been evaporated, the residue is distilled at 125°–130° C./0.6 torr.

The distillate is disolved in a little ethanol and a concentrated ethanolic solution of 17.4 g. (0.15 mole) maleic acid is added to it. The resulting solution is treated with an equal volume of anhydrous diethyl ether and a crystalline product is obtained, which when recrystallized from a little ethanol-diethyl ether, melts at 137–139° C. The yield is 38%.

*Analysis.*—Calc. for $C_{10}H_{17}N_3.C_4H_4O_4$ (percent): N=14.26. Found (percent): N=13.96.

The perchloric acid titre is 97.9% of theory. The compounds listed in Table 3 have been prepared by an identical process.

acetone, and allowed to cool. The crystals formed are filtered off. They melt at 220°–234° C.

After further recrystallization from acetone, they melt at 237°–239° C. The acidimetric titre is 99.6%.

By an identical procedure, starting from 2-phenyl-3-methylamino-4,5,6,7-tetrahydroindazole, 2-phenyl-3-dimethylamino-4,5,6,7-tetrahydroindazole hydrochloride is obtained in 55% yield, M.P. 132° C.

*Analysis.*—Calc. for $C_{15}H_{19}N_3.HCl$ (percent): N=15.16. Found (percent): N=15.06.

The acidimetric titre is 101.2%.

EXAMPLE 8

2-phenyl-3-methylamino-7-thiocarbomethylamino-4,5,6,7-tetrahydroindazole 24.4 g. (0.1 mole) of 2,6-di-(thiocarbomethylamino)-1-cyclo-hexanone, 14.4 g. (0.1 mole) of phenylhydrazine hydrochloride, 13.8 g. (0.1 mole) of ground potassium

TABLE 3

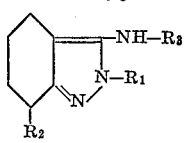

| $R_1$ | $R_2$ | $R_3$ | Yield, percent | M.P. | N percent Calc. | N percent Found | Acidimetric titre | Base, B.P. °C./Torr. |
|---|---|---|---|---|---|---|---|---|
| $CH_3$ | H | $(C_2H_5)$ | 38 | 137–139° | 14.23 | 13.96 | 97.9 | 125–130/0.6 |
| $CH_3$ | H | $i$-$C_3H_7$ | 34 | 131–134° | 13.59 | 13.87 | 98.7 | 104–7/0.1 |
| $CH_3$ | H | $n$-$C_4H_9$ | 31 | 97–98° | 13.00 | 13.04 | 97.0 | 127–133/0.2 |
| $CH_3$ | H | $CH_2$—$CH$=$CH_2$ | 50 | 105–108° | 13.68 | 13.25 | 97.2 | 122–5/0.2 |
| $CH_3$ | H | $CH_2C_6H_5$ | 42 | 116–118° | 11.76 | 11.72 | 97.7 | 165–6/0.1 |
| $CH_3$ | H | $n$-$C_3H_7$ | 35 | 117–119° | 13.59 | 13.62 | 98.2 | 115–120/0.01 |
| $C_2H_5$ | H | $CH_3$ | 45 | 110–11° | 14.23 | 14.13 | 99.2 | 115–125/0.05 |
| $n$-$C_3H_7$ | H | $CH_3$ | 46 | 108–110° | 13.59 | 13.79 | 97.2 | 118–120/0.01 |
| $n$-$C_4H_9$ | H | $CH_3$ | 30 | 109–110° | 13.00 | 12.79 | 98.6 | 125–8/0.01 |
| $CH_2CH_2OH$ | H | $CH_3$ | 37 | 130–134° | 21.53 | 21.67 | 99.3 | 170–3/0.2 |
| $CH_2CH(OH)CH_2SCH_3$ | H | $CH_3$ | 25 | 111–113° | 11.32 | 11.41 | | 185–7/0.05 |

EXAMPLE 7

3-dimethylamino-4,5,6,7-tetrahydroindazole 11.6 g. (0.076 mole) of 3-methylamino-4,5,6,7-tetrahydroindazole are dissolved in a water-bath in 10.5 of 98% formic acid, 6 ml. of 38.25% aqueous formaldehyde are added thereto, and the mixture is heated on a water-bath for 4 hours. It is then evaporated in vacuo, made alkaline with potassium carbonate, and extracted with chloroform. The extract is dried over sodium sulphate, and evaporated, and the white solid residue is extracted with diethyl ether. The insoluble portion is filtered off, the solution is dried, and ethereal hydrochloric acid is added. The precipitate is filtered off, heated with a little carbonate, and 100 ml. of 95% ethanol are refluxed with stirring for 2.5 hours. The boiling solution is filtered off with suction from the salts formed and allowed to stand overnight. The crystals which have separated are recrystallized twice from absolute ethanol (2.2 ml./g.), and 2-phenyl-3-methylamino-7-thiocarbomethylamino-4,5,6,7-tetrahydroindazole, M.P. 131°–133° C. is obtained in a yield of 80%.

*Analysis.*—Calc. for $C_{16}H_{20}N_4S$ (percent): N=18.66; S=10.66. Found (percent): N=18.66; S=10.7.

By an identical procedure, the compounds listed in Table 4 are obtained from equimolar amounts of 2,6-di (thiocarbomethylamino)-1-cyclo-hexanone and the appropriate substituted hydrazines.

TABLE 4

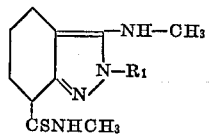

| | | | Analysis | | | | | |
|---|---|---|---|---|---|---|---|---|
| | | | N percent | | S percent | | Cl percent | |
| $R_1$ | Yield, percent | M.P., °C. | Calc. | Found | Calc. | Found | Calc. | Found |
| $CH_3$ | 24 | [1] 198–201 | 20.43 | 20.60 | 11.67 | 11.75 | | |
| —$COOC_2H_5$ | 70 | [2] 171–173 | 18.91 | 18.25 | 18.81 | 18.57 | | |
| Cl—⟨⟩— | 65 | [2] 157 | 16.76 | 16.97 | 9.58 | 9.78 | 10.62 | 10.52 |
| $CH_3O$—⟨⟩— | 40 | [2] 127–9 | 16.96 | 16.60 | 9.69 | 9.63 | | |

[1] Hydrochloride.
[2] Base.

EXAMPLE 9

2-phenyl-3-methylamino-7-carboxy-4,5,6,7-tetrahydroindazole

A mixture of 3.85 g. (0.012 mole) of 2-phenyl-3-methylamino-7-thiocarbomethylamino - 4,5,6,7 - tetrahydroindazole, 4 ml. of concentrated sulphuric acid, 12.5 ml. of acetic acid, and 8 ml. of water is refluxed for 12 hours. It is then diluted with two volumes of water, the sulphuric acid is neutralized with potassium carbonate, and it is then extracted with diethyl ether. After the ethereal solution has been allowed to stand for some hours, a crystalline powder separates out which, when crystallized from aqueous ethanol, affords 2.7 g. (80%) of 2-phenyl-3-methylamino-7-carboxy-4,5,6,7-tetrahydroindazole, M.P. 156°–158° C.

*Analysis.*—Calc. for $C_{15}H_{17}N_3O_2$ (percent): N=15.49. Found (percent): N=15.54.

The acidimetric titre is 98.6%.

EXAMPLE 10

1(2)-benzoyl-3-dimethylamino-4,5,6,7-tetrahydroindazole 3 g. (0.015 mole) of 3-dimethylamino-4,5,6,7-tetrahydroindazole hydrochloride are dissolved in a little water. The solution is made alkaline with potassium carbonate and extracted with diethyl ether. The ethereal solution is dried and evaporated. The residue is dissolved in 20 ml. of dry benzene. To this solution 2.1 g. (0.015 mole) of finely ground potassium carbonate are added together with 2.1 g. (0.015 mole) of benzoyl chloride. The mixture is refluxed in the absence of moisture for 6 hours and then filtered. The filtrate is evaporated in vacuo, the residual oil is taken up with dry diethyl ether, and the solution is treated with ethereal hydrochloric acid. The precipitate is filtered off and recrystallized from acetone. It melts at 129°–131° C. The yield is 66%.

*Analysis.*—Calc. for $C_{16}H_{19}N_3O \cdot HCl$ (percent): N=13.77. Found (percent): N=14.47.

The hydrochloride titre is 100.1%.

By an identical procedure the compounds listed in Table 5 are obtained from equimolar amounts of 3-dimethylamino-4,5,6,7-tetrahydroindazole and corresponding benzoyl chlorides.

TABLE 5

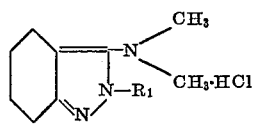

| $R_1$ | Yield, percent | M.P. ° C. | Analysis Cl, percent Calc. | Analysis Cl, percent Found | Hydrochloride titre, percent |
|---|---|---|---|---|---|
| Cl—⟨⟩—CO— | 80 | 122–5 | [1] 20.9 | [2] 20.28 | 100.5 |
| CH₃O—⟨⟩—CO | 73 | 141–3 | | | 99.2 |

[1] N percent=12.38.
[2] N percent=12.84.

What we claim is:

1. 2 - (4 - chloro)-phenyl-3-methylamino-4,5,6,7-tetrahydroindazole or a non-toxic acid addition salt thereof.
2. 2 - (4 - methoxy)-phenyl-3-methylamino-4,5,6,7-tetrahydroindazole or a non-toxic acid addition salt thereof.
3. 2 - carbethoxymethyl - 3-methylamino-4,5,6,7-tetrahydroindazole or a non-toxic acid addition salt thereof.
4. 3 - methylamino - 4,5,6,7-tetrahydroindazole or a non-toxic acid addition salt thereof.
5. 3 - methylamino - 7-methyl-4,5,6,7-tetrahydroindazole or a non-toxic acid addition salt thereof.
6. 2 - methyl - 3-methylamino-4,5,6,7-tetrahydroindazole or a non-toxic acid addition salt thereof.
7. 2 - methyl - 3-ethylamino-4,5,6,7-tetrahydroindazole or a non-toxic acid addition salt thereof.
8. 2 - methyl - 3-n-propylamino-4,5,6,7-tetrahydroindazole or a non-toxic acid addition salt thereof.
9. 2 - methyl - 3-isopropylamino-4,5,6,7-tetrahydroindazole or a non-toxic acid addition salt thereof.
10. 2 - methyl - 3-n-butylamino-4,5,6,7-tetrahydroindazole or a non-toxic acid addition salt thereof.
11. 2 - methyl-3-allylamino-4,5,6,7-tetrahydroindazole or a non-toxic acid addition salt thereof.
12. 2 - methyl - 3-benzylamino-4,5,6,7-tetrahydroindazole or a non-toxic acid addition salt thereof.
13. 2 - ethyl - 3-methylamino-4,5,6,7-tetrahydroindazole or a non-toxic acid addition salt thereof.
14. 2 - n - propyl-3-methylamino-4,5,6,7-tetrahydroindazole or a non-toxic acid addition salt thereof.
15. 2 - n - butyl-3-methylamino-4,5,6,7-tetrahydroindazole or a non-toxic acid addition salt thereof.
16. 2 - ($\beta$ - hydroxyethyl)-3-methylamino-4,5,6,7-tetrahydroindazole or a non-toxic acid addition salt thereof.
17. 2 - ($\beta$ - hydroxy-$\gamma$-methylmercaptopropyl)-3-methylamino-4,5,6,7-tetrahydroindazole or a non-toxic acid addition salt thereof.
18. 3 - dimethylamino-4,5,6,7-tetrahydroindazole or a non-toxic acid addition salt thereof.
19. 2 - phenyl - 3 - dimethylamino-4,5,6,7-tetrahydroindazole or a non-toxic acid addition salt thereof.
20. 2 - phenyl - 3-methylamino-7-thiocarbomethylamino-4,5,6,7-tetrahydroindazole or a non-toxic acid addition salt thereof.
21. 2 - methyl - 3-methylamino-7-thiocarbomethylamino-4,5,6,7-tetrahydroindazole or a non-toxic acid addition salt thereof.
22. 2 - carbethoxy - 3-methylamino-7-thiocarbomethylamino-4,5,6,7-tetrahydroindazole or a non-toxic acid addition salt thereof.
23. 2 - (4 - chloro)-phenyl-3-methylamino-7-thiocarbomethylamino - 4,5,6,7-tetrahydroindazole or a non-toxic acid addition salt thereof.
24. 2 - (4 - methoxy)-phenyl-3-methylamino-7-thiocarbomethylamino-4,5,6,7-tetrahydroindazole or a non-toxic acid addition salt thereof.
25. 2 - phenyl - 3-methylamino-7-carboxy-4,5,6,7-tetrahydroindazole or a non-toxic acid addition salt thereof.
26. 1(2) - benzoyl - 3-dimethylamino-4,5,6,7-tetrahydroindazole or a non-toxic acid addition salt thereof.
27. 1(2) - (4 - chloro) - benzoyl-3-dimethylamino-4,5,6,7-tetrahydroindazole or a non-toxic addition salt thereof.

28. 1(2)-(methoxy) - benzoyl - 3 - dimethylamino-4,5,6,7-tetrahydroindazole or a non-toxic acid addition salt thereof.

References Cited

Auwers et al., Chem. Abst. vol. 18, pp. 834–6 (1924).
Auwers et al., Chem. Abst. vol 20, p. 389 (1926).
Farbenfabriken Bayer Chem. Abst. vol. 60, col. 6957 (1964).
Kwartler et al., Jour. Amer. Chem. Soc. vol. 65, p. 1805 relied on (1943).
Pocar et al., Chem. Abst. vol. 59, cols. 2795–6 (1963).

HENRY R. JILES, Primary Examiner

N. TROUSOF, Assistant Examiner

U.S. Cl. X.R.

260—247, 247.1, 247.2, 293, 293.4, 294, 326.3, 326.8, 326.82, 569, 583, 584; 424—273